No. 736,750. PATENTED AUG. 18, 1903.
F. W. LEUTHESSER.
STEAM TRAP.
APPLICATION FILED FEB. 18, 1902.
NO MODEL.
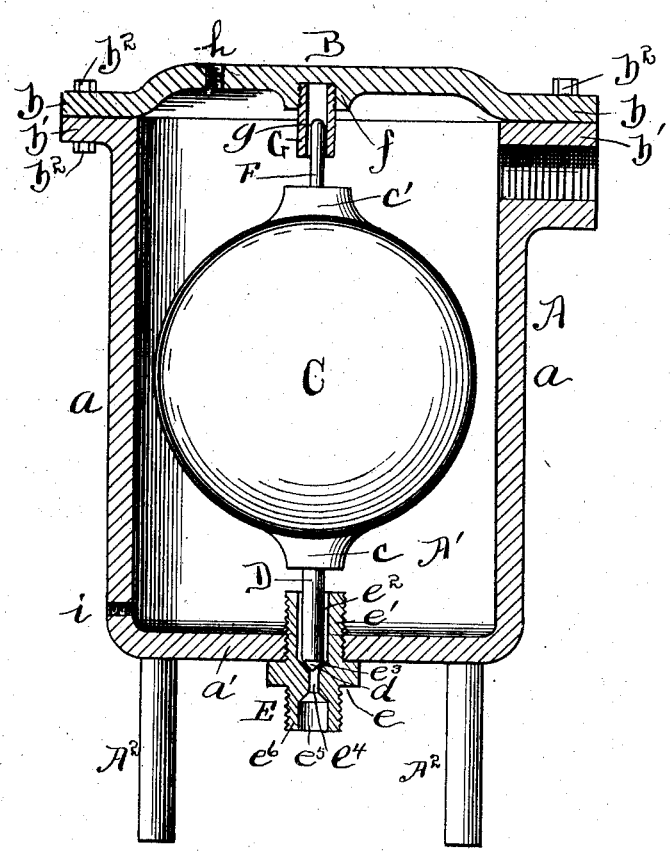

No. 736,750.

Patented August 18, 1903.

UNITED STATES PATENT OFFICE.

FRED W. LEUTHESSER, OF CHICAGO, ILLINOIS, ASSIGNOR TO MONASH-YOUNKER COMPANY, OF CHICAGO, ILLINOIS, A CORPORATION OF ILLINOIS.

STEAM-TRAP.

SPECIFICATION forming part of Letters Patent No. 736,750, dated August 18, 1903.

Application filed February 18, 1902. Serial No. 94,644. (No model.)

*To all whom it may concern:*

Be it known that I, FRED W. LEUTHESSER, a citizen of the United States, residing at Chicago, in the county of Cook and State of Illinois, have invented a certain new and useful Improvement in Steam-Traps, of which the following is a specification.

This invention relates to traps more especially intended for use in receiving and discharging the water of condensation produced in steam heating and other apparatus where steam is the agent employed, and has for its objects to simplify and improve the construction and operation of the trap as a whole, to enable access to be readily obtained to the interior of the trap by removing the cover without detaching or breaking the connection of the trap to the apparatus with which the trap is used, and to simplify and cheapen the trap, more especially with reference to the support and guide for the float, without destroying or impairing the efficiency and reliability of the trap in use.

The invention consists in the features of construction and combination of parts hereinafter described, and pointed out in the claims as new.

In the drawing the figure is a sectional elevation of the casing and cover and the guide on the cover and the discharge-nipple at the bottom of the casing, with the float and the parts connected therewith in elevation.

The trap is constructed with a shell or casing A, having a circumferential wall $a$ and a bottom wall $a'$ and open at the top, forming within the shell or casing a chamber A', and, as shown, the shell or casing is supported on legs A², adapted to rest upon a floor or other support to properly locate the trap in correct relation to receive the water of condensation and allow the water of condensation to enter the chamber A' and be discharged therefrom. The open end of the chamber of the shell or casing is closed by a cap or cover B, having a flat peripheral rim $b$, which fits against a flange or rim $b'$ on the upper end of the shell or casing, through which rims $b$ and $b'$ bolts $b^2$ pass for attaching the cap or cover to the shell or casing.

A float C, made of metal or other suitable material and preferably of a globular or spherical form, is located and operates within the chamber A', rising and falling in such chamber with the rise and fall of the water of condensation in the chamber. The float on one side, which may be termed the "bottom" side, has a boss $c$, connected with and depending from which is a stem D, having a pointed end $d$, and constituting a valve-stem for controlling the discharge from the chamber A' of the trap. The valve-stem coacts with a discharge-nipple E, having a circumferential flange $e$ and a threaded stem $e'$, which is screw-threaded through an opening therefor in the bottom wall of the shell or casing, so that the threaded stem $e'$ projects into the chamber of the trap above the bottom wall of the shell or casing. The threaded stem $e'$ has therein a passage $e^2$, into which the valve-stem D enters, and the bottom of the passage is tapered to correspond with the taper of the valve-stem end $d$ and furnish a seat $e^3$ for such end. A passage or port $e^4$ leads from the passage $e^2$ into a passage $e^5$ in a neck or stem $e^6$, having an exterior screw-thread for the attachment of a discharge-pipe, (not shown,) so that with the rise of the float, carrying with it the valve-stem D, the port $e^4$ will be opened, allowing the water of condensation to escape from the chamber A' of the trap.

The opposite or upper side of the float has a boss $c'$, projecting from which is a guide-stem F, which enters a guide-tube G, screw-threaded into a boss $f$ on the inner face of the cap or cover B and having a hole or passage $g$ to furnish a guideway for the stem F in the rise and fall of the float, by which the float will be held in a direct-line movement vertically in rising and falling, thus insuring the seating of the valve-stem D with the fall of the float. The guide-tube G is screw-threaded into its boss $f$ of the cover, making a simple connection for the guide-tube with the cover and leaving the top of the cover in line with the guide-tube unbroken, rendering the cover tight at this point by reason of the solid formation of the unbroken cover. A boss H is formed on the shell or casing at one side adjacent to the top, which nipple, as shown, is interiorly screw-threaded for the attachment of a suitable coupling, connecting the trap as a whole with the heating apparatus by a suitable connecting-pipe or otherwise. (Not shown.) The cover is provided with a screw-threaded hole $h$ for the attachment of a suitable vent-cock or relief-valve for the air, which vent-cock or relief-valve may be of any suitable and well-known form of construction and is therefore neither shown nor described. The shell or casing adjacent to the bottom has in its circumferential wall a screw-threaded hole or opening $i$ for the attachment of a blow-off cock or valve, which cock or valve may be of any suitable and well-known form of construction and is therefore neither shown nor described and by means of which the chamber of the trap can be blown off to clear the chamber of any sediment or deposit or for any other purpose.

The construction of the trap as a whole is very simple, as the shell or casing, with its circumferential wall and bottom wall and its supporting-legs and the inlet nipple and opening, can be cast or formed integral, thus making the expense nominal. The cap or cover can also be cast or otherwise formed of metal or other material and can be attached to the shell or casing by the bolts or otherwise. The valve-seat for the valve-stem of the float is in the shape of a nipple, which can be screw-threaded into the bottom wall of the shell or casing, and the guide for the guide-stem of the float is a short tube screw-threaded into the cap or cover, making the connection and support for the float at both the top and bottom very cheap and simple and at the same time perfect and reliable. The float can have the boss at the bottom and top sides formed therewith or suitably secured thereto for the bosses to receive and carry the valve-stem and the guide-stem in perfect alinement one with the other, making the attachment of these stems to the float easily attained and in correct relation for coöperation with the valve-nipple at the bottom and the guide-tube at the top, by which the rise and fall of the float will be assured in a straight line of movement for properly and correctly seating the valve-stem with the fall of the float, and the valve-nipple with its outer neck or wall screw-threaded on the exterior furnishes an attachment for a discharge pipe or tube to escape the water of condensation which flows out from the chamber of the trap when the valve-stem is raised from its seat in the nipple. It will thus be seen that the valve as a whole is simple in formation and very economical in its construction as to material and work and at the same time will be found efficient and reliable for the intended use.

In operation, with the float down and the valve-stem seated, the water of condensation entering through the inlet-opening of the attaching-boss H rises in the chamber A and gradually fills the chamber, and when a level of the water in the chamber reaches a point to overcome the gravity of the float and the pressure in the chamber the buoyancy of the float asserts itself and causes the float to rise, lifting the valve-stem from its seat and opening the discharge-port in the nipple for the water of condensation to flow out, and the discharge of the water will continue until a sufficiently low level is reached for the float to fall and seat the valve-stem, closing the discharge-port and allowing the water of condensation to again rise in the chamber until the lifting-level for the float is reached to open the valve-stem, and this rising and falling of the float will continue as long as the steam heating or other apparatus with which the trap is connected is in operation, producing water of condensation. The projected stem of the discharge-nipple which is entered into the chamber forms an annular wall around the discharge passage and port, which allows the sediment and other particles to be deposited in the lower end or bottom of the chamber, thereby preventing the sediment and particles from entering the passage in the nipple for the valve-stem and clogging such passage and the discharge-port, thus interfering with the efficiency of the operation of the trap. The sediment and particles deposited can be blown off when desired by opening the blow-off cock or valve connected with the trap at the opening $i$ in the wall of the shell or casing. Any excess of air-pressure in the trap which would interfere with the proper operation of the float can be relieved by opening the vent cock or valve attached to the trap at the screw-threaded opening $h$ in the cap or cover. The float is held positively central in the body of the trap and free to rise and fall by the stems on its opposite side, and the guide-tube and discharge-nipple will receive the stems, enabling the float to rise and fall by its buoyancy and gravity, opening and closing the discharge-valve without any friction or resistance. The inlet is always wide open and is unobstructed by any of the stems or other parts of the trap, leaving a free induction into the trap of the water of condensation, and the attachment of the cover is one that enables access to be had to the interior of the trap for cleansing or other purpose without the necessity of disconnecting the trap, as the cover can be detached, and in so detaching none of the connections will be disturbed. These features add greatly to the construction and operation of the trap as a whole and in connection with the economy of construction and reliability of operation make the trap very desirable for use.

What I regard as new, and desire to secure by Letters Patent, is—

1. In a steam-trap, the combination of a shell or casing having a circumferential wall and a bottom wall with an open top, a removable closing cap or cover for the open top, a spherical float located and operating in the chamber of the shell or casing, a stem-valve carried by the lower side of the float, a nipple entered into the bottom wall of the shell or casing in axial line with the stem-valve and having a passage and port therethrough with a seat around the port for the seating end of the stem-valve, a guide-stem carried by the upper side of the float in alinement with the stem-valve, a guide-tube for the guide-stem entered into the under side of the cap or cover and closed at its entered end by the body of the cap or cover, and a straightway induction-passage for the water of condensation leading into the chamber of the shell or casing at the top of the shell or casing and below the plane of the upper edge thereof and opening through the circumferential wall of the shell or casing in a direct line below and free of the cap or cover, substantially as described.

2. In a steam-trap, the combination of a shell or casing having a circumferential wall and a bottom wall with an open top, a removable closing cap or cover for the open top, a spherical float located and operating in the chamber of the shell or casing, a stem-valve carried by the lower side of the float, a nipple entered into the bottom wall of the shell or casing in axial line with the stem-valve and having a passage and port therethrough with a seat around the port for the seating end of the stem-valve, a guide-stem carried by the upper side of the float in alinement with the stem-valve, a guide-tube for the guide-stem entered into the under side of the cap or cover and closed at its entered end by the body of the cap or cover, and a boss on one side of the shell or casing at the top thereof, the boss and the circumferential wall of the casing having a straightway hole provided with a screw-thread for the attachment of a pipe and the straightway hole forming an induction-passage for the water of condensation opening through the wall of the shell or casing in a direct line below the plane of the upper edge of the shell or casing and free of the cap or cover, substantially as described.

3. In a steam-trap, the combination of a shell or casing having a circumferential wall and a bottom wall with an open top, a removable closing cap or cover for the open top, a spherical float located and operating in the chamber of the shell or casing, a stem-valve carried by the lower side of the float, a nipple entered into the bottom wall of the shell or casing in axial line with the stem-valve and having a passage and port therethrough with a seat around the port for the seating end of the stem-valve, a guide-stem carried by the upper side of the float in alinement with the stem-valve, a guide-tube for the guide-stem entered into the under side of the cap or cover and closed at its entered end by the body of the cap or cover, a boss on one side of the shell or casing at the top thereof, the boss and the circumferential wall of the casing having a straightway hole provided with a screw-thread for the attachment of a pipe and the straightway hole forming an induction-passage for the water of condensation opening through the wall of the shell or casing in a direct line below the plane of the upper edge of the shell or casing and free of the cap or cover, an opening in the cap or cover for the attachment of a vent cock or valve, and an opening in the circumferential wall of the shell or casing adjacent to the bottom for the attachment of a blow-off cock or valve, substantially as described.

FRED W. LEUTHESSER.

Witnesses:
THOMAS A. BANNING,
WALKER BANNING.